United States Patent [19]
Wietsma

[11] 3,948,822
[45] Apr. 6, 1976

[54] LATEX FOR FORMING NON-GELLING VULCANIZABLE SOLID FOAM
[75] Inventor: Popke Wietsma, Velp, Netherlands
[73] Assignee: Chemische Industrie AKU-Goodrich B.V., Arnhem, Netherlands
[22] Filed: July 13, 1973
[21] Appl. No.: 378,940

[30] Foreign Application Priority Data
July 14, 1972 Netherlands...................... 7209742

[52] U.S. Cl............ 260/2.5 L; 260/5; 260/29.7 SQ; 260/723; 260/815
[51] Int. Cl.² ..... C08L 7/02; C08L 9/10; C08J 9/30
[58] Field of Search .. 260/2.5 L, 29.7 NQ, 29.7 SQ, 260/723, 815

[56] References Cited
UNITED STATES PATENTS
3,320,201   5/1967   Sparks et al. ............... 260/29.7 NQ
3,491,033   1/1970   Dunn............................... 260/2.5 L Primary Examiner—Wilbert J. Briggs, Sr.
Attorney, Agent, or Firm—Stevens, Davis, Miller & Mosher

[57] ABSTRACT

A process for the preparation of a latex composition which is processable into a non-gelling vulcanizable solid foam and a process for coating a substrate with said foam.

3 Claims, No Drawings

LATEX FOR FORMING NON-GELLING VULCANIZABLE SOLID FOAM

BACKGROUND OF THE INVENTION

Non-gelling foams are known from, for example, the U.S. Pat. No. 3,491,033 and the British Patent Specifications No. 598,610, No. 828,899 and No. 1,285,706. The foam may be used for the coating of substrates such as paper, non-woven fabrics, textile materials and carpets. In applying the foam to a textile material such as lingerie, articles with a very attractive appearance are obtained. The use of it for carpets very much contributes to sound damping and walking comfort. Moreover, it prevents a carpet from slipping.

The known non-gelling compounded latices, however, have the disadvantage that during the heat treatment in the gelling oven or vulcanization oven cracks will often occur in the surface of the foam layer with which the substrates are coated. This development of cracks can be somewhat reduced by very careful drying, for example with the use of less intense infrared radiation, by choosing very critical process conditions, and preferably using a composition with a very high solids content. The actual results are nevertheless found to be unsatisfactory.

SUMMARY OF THE INVENTION

Latex and process for preparation which can be formed into a non-gelling vulcanizable solid foam comprising latex as an emulsifier, disodium-N-octadecyl sulfosuccinamate in combination with sodium formaldehyde sulfoxylate and coated substrates therefrom.

DETAILED DESCRIPTION

The invention relates to a process for the preparation of a latex composition which is processable into a non-gelling vulcanizable solid foam, said composition being constituted by a rubber latex, an emulsifier system and a vulcanization system.

The invention also relates to a process for coating a substrate with a non-gelling foam. The coating of the substrate may be carried out in a known manner by (a) converting a latex compound into a wet foam, (b) applying this foam in the desired thickness to the substrate, (c) subsequently passing the coated substrate through a gelling oven normally heated by infrared heaters where skin formation occurs, however without gellation and (d) the coated substrate is passed through a drying oven or a vulcanization oven, and possibly through a cooling zone, the vulcanization leading to the formation on the substrate of a layer of solid foam.

Surprisingly, it has now been found that with the latex composition according to the invention it is possible in a simple manner to obtain a coated substrate which does not have the above disadvantage if as emulsifier specifically di-sodium-N-octadecyl sulfosuccinamate is used together with sodium formaldehyde sulfoxylate.

In numerous experiments it was established that the use of other emulsifiers, in combination or not with sodium formaldehyde sulfoxylate, does not give satisfactory results, the wet foam being subject to destabilization in the gelling oven or the vulcanization oven and cracks being formed.

The emulsifier according to the invention may be employed in the usual amounts, for example in the range of about 1.5 to about 8 parts by weight of dry matter, calculated on 100 parts by weight of dry latex. In addition, other emulsifiers may be used, if desired. The sodium formaldehyde sulfoxylate is generally added in amounts of about 0.1 to about 1 part by weight of dry matter, more particularly 0.2 to 0.4 parts by weight of dry matter, calculated on 100 parts by weight of dry latex. Amounts higher than about 1 part by weight of dry formaldehyde sulfoxylate to 100 parts by weight of dry latex are also applicable, but do not lead to any further improvement. The sulfoxylate may at any stage be added to the compound itself or to one or more constituents of the compound, for example to one or more of the emulsifiers used. It should be added that it is known per se to use sodium formaldehyde sulfoxylate in the preparation of a latex as part of a redox catalyst system for the polymerization of the monomers. In the polymerization, however, the sulfozylate sulfoxylate used up, so that in that instance in the final latex no sulfoxylate is found. (See e.g. the U.S. Pat. No. 3,372,134).

As rubber latex may be applied any synthetic rubber latex, e.g. that of a homopolymer or copolymer of diolefines having 4 to 8 carbon atoms, e.g. 1.3-butadiene, isoprene, 1.4-dimethyl-1.3-butadiene and 1.3-dimethyl-1,3-butadiene, in combination, if desired, with monomers such as styrene, methyl acrylate ethyl acrylate, methyl methacrylate, ethyl methacrylate, acrylonitrile, N-methylolacrylamide, N-methylolmethacrylamide and isobutene; latices of copolymers of one or more alkyl acrylates and/or alkyl methacrylates in combination, if desired, with other monomers, e.g. styrene, vinyl chloride and vinylidene chloride; and also latices of polymers of chloroprene or mixtures thereof. It is preferred to use a styrene butadiene rubber latex, particularly a latex in which the copolymer contains more than 50% by weight of 1,3-butadiene. Suitable examples thereof are the styrene butadiene latices marketed by N.V. Chemische Industrie AKU-Goodrich (Ciago) under the trade names HYCAR 2550 H 5, 2550 H 33, 2550 H 85 and 2550 H 125. The solids content of the latex applied is usually at least 60%, but preferably about 65% or higher. The synthetic rubber latex may entirely or partly be replaced with natural rubber latex.

In the latex compound also fillers may be incorporated, for example in amounts in the range of 20 to 500 parts by weight to 100 parts by weight of dry latex. But the presence of fillers is not essential. As filler may be used, for example, starch, chalk, heavy spar and/or silicon compounds, e.g. kaolin and clay.

In the compound may also be introduced other usual or suitable compounds, for example dispersing agents, such as tetrasodium pyrophosphate; reinforcing latices such as polystyrene latex; resins, such as melamine formaldehyde resin; and antioxidants.

As vulcanization system may be employed any usual system, for instance a system having a maximum possible solids content. Usual constituents of the system are zinc oxide, sulphur and one or more vulcanization accelerators.

It has been found that a latex compound which does not yet contain the vulcanization system and, for instance, a filler will remain stable for a long time. After the vulcanization system and, if desired, filler(s) and/or other agents have been added, the resulting compound can successively be converted into a wet foam and a solid foam in a known manner.

Conversion of the composition into a wet foam may be done in a known manner, for example by applying a blowing agent or by mechanical foaming.

EXAMPLES 1 – 5.

A latex composition was prepared from the following constituents (in parts by weight).

was combined with the other constituents of the composition.

This composition was processed into a foam which was applied to a substrate. After a heat treatment and vulcanization under the normal conditions it was found

|  | Example 1 | | Example 2 | | Example 3 | |
| --- | --- | --- | --- | --- | --- | --- |
|  | dry | wet | dry | wet | dry | wet |
| Styrene butadiene rubber latex with a styrene to butadien ratio= 40:60 | 100 | 158 | 100 | 158 | 100 | 158 |
| Di-Na-N-octadecyl sulfosuccinamate | 1.8 | 5.3 | 4 | 11.5 | 5 | 14.4 |
| Na-formaldehyde sulfoxylate | 0.12 | 0.12 | 0.25 | 0.25 | 0.31 | 0.31 |
| Tetra-Na-pyrophosphate | 0.12 | 0.12 | 0.25 | 0.25 | 0.31 | 0.31 |
| Filler (clay) | 50 | 50 | 120 | 120 | 150 | 150 |
| ZnO | 3 | 6 | 3 | 6 | 3 | 6 |
| S | 2 | 4 | 2 | 4 | 2 | 4 |
| Zn-diethyldithiocarbamate | 1 | 2 | 1 | 2 | 1 | 2 |
| Zn-2-mercaptobenzothiazole | 1 | 2 | 1 | 2 | 1 | 2 |
| Antioxidant (2,2'-methylene bis ( 4-methylene 6-tert. butyl phenol) | 1 | 2 | 1 | 2 | 1 | 2 |
| Deionized water | — | — | — | — | — | — |
| Solids content of the composition (in %) | 71.0 | | 76.8 | | 78.5 | |

|  | Example 4 | | Example 5 | |
| --- | --- | --- | --- | --- |
|  | dry | wet | dry | wet |
| Styrene butadiene rubber latex with a styrene to butadiene ratio= 40:60 (Hycar 2550 H5) | 100 | 158 | 100 | 158 |
| Di-Na-N-octadecyl/sulfosuccinamate | 6 | 17.3 | 10 | 28.7 |
| Na-formaldehyde/sulfoxylate | 0.38 | 0.38 | 0.63 | 0.63 |
| Tetra-Na-pyrophosphate | 0.38 | 0.38 | 0.63 | 0.63 |
| Filler (clay) | 200 | 200 | 400 | 400 |
| ZnO | 3 | 6 | 3 | 6 |
| S | 2 | 4 | 2 | 4 |
| Zn-diethyldithiocarbamate | 1 | 2 | 1 | 2 |
| Zn-2-mercaptobenzothiazole | 1 | 2 | 1 | 2 |
| Antioxidant (2,2'-methylene-bis (4-methyl-6-tert.butyl phenol) | 1 | 2 | 1 | 2 |
| Deionized water | — | 10 | — | 57 |
| Solids content of the composition (in %) | 79.0 | | 79.0 | |

The composition was prepared by first intermixing the emulsifier, the sulfoxylate and the pyrophosphate and bringing the mixture to a pH of 10–10.5 with the aid of potassium hydroxide. Subsequently, this mixture that a resilient, uniform layer without cracks had been obtained.

EXAMPLES 6 – 10

A latex compound with the following constituents was prepared.

|  | Example 6 | | Example 7 | | Example 8 | |
| --- | --- | --- | --- | --- | --- | --- |
|  | dry | wet | dry | wet | dry | wet |
| Styrene butadiene rubber latex with a styrene to butadiene ratio= 45:55 (Hycar 2550 H 5) | 100 | 158 | 100 | 158 | 100 | 158 |
| Di-Na-N-octadecyl sulfosuccinamate | 1.8 | 5.3 | 4 | 11.5 | 5 | 14.4 |
| Na-formaldehyde sulfoxylate | 0.12 | 0.12 | 0.25 | 0.25 | 0.31 | 0.31 |
| Tetra-Na-pyrophosphate | 0.12 | 0.12 | 0.25 | 0.25 | 0.31 | 0.31 |
| Filler (clay) | 50 | 50 | 120 | 120 | 150 | 150 |
| ZnO | 2.73 | 5.46 | 2.73 | 5.46 | 2.73 | 5.46 |
| S | 1.82 | 3.64 | 1.82 | 3.64 | 1.82 | 3.64 |
| Zn-diethyldithiocarbamate | 0.91 | 1.82 | 0.91 | 1.82 | 0.91 | 1.82 |
| Zn-2-mercaptobenzothiazole | 0.91 | 1.82 | 0.91 | 1.82 | 0.91 | 1.82 |
| Antioxidant (2,2'-methylene-bis(4-methyl-6-tert. butyl phenol) | 0.91 | 1.82 | 0.91 | 1.82 | 0.91 | 1.82 |
| Deionized water | — | — | — | — | — | — |
| Solids content of the composition (in %) | 70.0 | | 76.0 | | 78.0 | |

-continued

|  | Example 6 dry | wet | Example 7 dry | wet | Example 8 dry | wet |
|---|---|---|---|---|---|---|

|  | Example 9 dry | wet | Example 10 dry | wet |
|---|---|---|---|---|
| Styrene butadiene rubber latex with a styrene to butadiene ratio= 45:55(Hycar 2550 H 5) | 100 | 158 | 100 | 158 |
| Di-Na-N-octadecyl sulfo-succinamate | 6 | 17.3 | 10 | 28.7 |
| Na-formaldehyde sulfoxylate | 0.38 | 0.38 | 0.63 | 0.63 |
| Tetra-Na-pyrophosphate | 0.38 | 0.38 | 0.63 | 0.63 |
| Filler (Clay) | 200 | 200 | 400 | 400 |
| ZnO | 2.73 | 5.46 | 2.73 | 5.46 |
| S | 1.82 | 3.64 | 1.82 | 3.64 |
| Zn-diethyldithiocarbamate | 0.91 | 1.82 | 0.91 | 1.82 |
| Zn-2-mercaptobenzothiazole | 0.91 | 1.82 | 0.91 | 1.82 |
| Antioxidant (2,2'-methylene--bis (4-methyl-6-tert.butyl phenol) | 0.91 | 1.82 | 0.91 | 1.82 |
| Deionized water | — | 10 | — | 57 |
| Solids content of the composition (in %) |  | 78.5 |  | 78.5 |

The composition was prepared by first intermixing the emulsifier, the sulfoxylate and the pyrophosphate and bringing the mixture to a pH in the range of 10 to 10.5 with the aid of potassium hydroxide. Subsequently, the mixture was combined with the other constituents of the composition.

This composition was processed into a foam, which was applied to a substrate. After a heat treatment and vulcanization it was found that a resilient, uniform foam layer without cracks had been obtained.

COMPARATIVE EXAMPLES

The examples 1–10 were repeated, except that no use was made of sodium formaldehyde sulfoxylate. In all cases a foam layer with many surface cracks was obtained.

Example 1 was repeated with the use, however, of the following emulsifiers instead of di-sodium-N-octadecyl-sulfosuccinamate:
a. potassium oleate
b. ammonium oleate
c. ammonium ricinoleate
d. sodium lauryl sulphate
e. nonyl phenol polyglycol ether (4 moles ethylene oxide per mole phenol)
f. nonyl phenol polyglycol ether (9 moles ethylene oxide per mole phenol)
g. polyethylene oxide
h. sodium dodecyl benzene sulphonate
i. alkylarylpolyether alcohol
j. disproportionated rosin acid soap
k. alkyl naphtalene sodium sulphonate
l. N,N,N',N'-tetrakis β-hydroxyalkyl ethylene diamine
m. sodium lauryl ester phosphate
n. lecithine
o. cetyl trimethylammonium bromide
p. cetyl trimethylammonium chloride
q. N,N'-diphenylguanidine
r. "Vulcofor EFA" (adduct of ethyl chloride, formaldehyde and ammonia)
s. di-sodium-N-eicosyl-sulfosuccinamate In all cases a foam layer with surface cracks was obtained.

I claim:
1. A process for the preparation of a rubber latex composition adapted to be converted into a wet foam and dried without substantial gelling to form a solid foam which comprises mixing with the latex from about 1.5 to about 8 parts by weight disodium-N-octadecyl sulfosuccinamate and from about 0.1 to about 1 part sodium formaldehyde sulfoxylate by weight per 100 parts by weight dry latex.

2. Process according to claim 1, characterized in that to 100 parts by weight of dry latex also 20 to 500 parts by weight of a filler are incorporated into the composition.

3. Latex composition containing a rubber latex, di-sodium-N-octadecyl sulfosuccinamate, sodium formaldehyde sulfoxylate and a vulcanization system.

* * * * *